United States Patent
Zhang et al.

(10) Patent No.: US 12,120,686 B2
(45) Date of Patent: Oct. 15, 2024

(54) SERVICE CONFLICT PROCESSING METHOD, USER TERMINAL AND COMPUTER READABLE STORAGE MEDIUM

(71) Applicant: BEIJING UNISOC COMMUNICATIONS TECHNOLOGY CO., LTD., Beijing (CN)

(72) Inventors: Sa Zhang, Shanghai (CN); Huan Zhou, Shanghai (CN)

(73) Assignee: BEIJING UNISOC COMMUNICATIONS TECHNOLOGY CO., LTD., Beijing (CN)

( * ) Notice: Subject to any disclaimer, the term of this patent is extended or adjusted under 35 U.S.C. 154(b) by 707 days.

(21) Appl. No.: 17/265,930

(22) PCT Filed: Jun. 26, 2019

(86) PCT No.: PCT/CN2019/092979
§ 371 (c)(1),
(2) Date: Feb. 4, 2021

(87) PCT Pub. No.: WO2020/029697
PCT Pub. Date: Feb. 13, 2020

(65) Prior Publication Data
US 2021/0307004 A1    Sep. 30, 2021

(30) Foreign Application Priority Data

Aug. 10, 2018  (CN) .......................... 201810912738.3

(51) Int. Cl.
*H04W 72/04* (2023.01)
*H04L 1/1812* (2023.01)
(Continued)

(52) U.S. Cl.
CPC ........... *H04W 72/21* (2023.01); *H04L 1/1819* (2013.01); *H04L 1/1896* (2013.01);
(Continued)

(58) Field of Classification Search
CPC ............. H04W 72/21; H04W 72/0446; H04W 72/0453; H04W 72/23; H04W 72/569; H04L 1/1819; H04L 1/1896
See application file for complete search history.

(56) References Cited

U.S. PATENT DOCUMENTS

2017/0332358 A1   11/2017  Park et al.
2018/0070341 A1   3/2018   Islam et al.
(Continued)

FOREIGN PATENT DOCUMENTS

CN   107734678 A   2/2018
CN   108370546 A   8/2018
(Continued)

OTHER PUBLICATIONS

Huawei et al. "Discussion on UCI feedback for URLLC" *3GPP TSG RAN WG1 Ad Hoc Meeting, R1-1800054*, Jan. 13, 2018 (Jan. 13, 2018), document, part 4.
(Continued)

*Primary Examiner* — John D Blanton
(74) *Attorney, Agent, or Firm* — Harness, Dickey & Pierce, P.L.C.

(57) ABSTRACT

A service conflict processing method, a user terminal, and a computer-readable storage medium. The method comprises: determining whether UCI of an eMBB service currently being transmitted collides with data or UCI of an URLLC service with respect to transmission time, wherein the UCI of the eMBB service comprises HARQ-ACK information; and if the UCI of the eMBB service has collided with the data or the UCI of the URLLC service with respect to
(Continued)

transmission time, delaying the transmission of the UCI of the eMBB service. The solution can be employed to improve spectral efficiency of the system.

16 Claims, 4 Drawing Sheets

(51) Int. Cl.
*H04L 1/1867* (2023.01)
*H04W 72/0446* (2023.01)
*H04W 72/0453* (2023.01)
*H04W 72/21* (2023.01)
*H04W 72/23* (2023.01)

(52) U.S. Cl.
CPC ... *H04W 72/0446* (2013.01); *H04W 72/0453* (2013.01); *H04W 72/23* (2023.01)

(56) References Cited

U.S. PATENT DOCUMENTS

| | | | |
|---|---|---|---|
| 2019/0053211 A1* | 2/2019 | Ying | H04W 72/044 |
| 2019/0268938 A1 | 8/2019 | Zhao et al. | |
| 2020/0008216 A1* | 1/2020 | Iyer | H04W 72/23 |
| 2020/0045722 A1 | 2/2020 | Bae et al. | |
| 2020/0137781 A1* | 4/2020 | Shao | H04L 5/0053 |
| 2020/0296673 A1 | 9/2020 | Ouchi et al. | |
| 2021/0058922 A1* | 2/2021 | Han | H04L 5/0055 |

FOREIGN PATENT DOCUMENTS

| | | |
|---|---|---|
| WO | WO-2017075838 A1 | 5/2017 |
| WO | WO-2018059876 A1 | 4/2018 |
| WO | WO-2018/143738 A1 | 8/2018 |

OTHER PUBLICATIONS

Huawei et al. "PUCCH reliability" *3GPP TSG RAN WG1 Meeting #92, R1-1801358*, Feb. 17, 2018 (Feb. 17, 2018), document, part 3.
International Search Report (English and Chinese) and Written Opinion (Chinese) of the International Searching Authority issued in PCT/CN2019/092979, mailed Sep. 9, 2019; ISA/CN.
Etri: "UCI multiplexing of different usage scenario", 3GPP Draft; R1-1802145, 3rd Generation Partnership Project (3GPP), Mobile Competence Centre; 650, Route Des Lucioles; F-06921 Sophia-Antipolis Cedex, France, RAN WG1, Athens, Greece; Feb. 17, 2018 (Feb. 17, 2018), XP051397812.
European Search Report regarding Application No. 19845980.2, dated Apr. 5, 2022.
India Office Action regarding Application No. 202117009008, dated Jan. 25, 2022.
Vivo: "Discussion an eMBB and URLLC UCI multiplexing", 3GPP Draft; R1-1806064 Discussion on EMBB and URLLC UCI Multiplexing, 3rd Generation Partnership Project (3GPP), Mobile Competence Centre ; 650, Route Des Lucioles; F-06921 Sophia-Antipolis Cedex; France, RAN WG1, Busan, Korea; May 20, 2018 (May 20, 2018), XP051441279.

\* cited by examiner

SERVICE CONFLICT PROCESSING METHOD, USER TERMINAL AND COMPUTER READABLE STORAGE MEDIUM

CROSS-REFERENCE TO RELATED APPLICATIONS

This application is the national phase of International Application No. PCT/CN2019/092979, filed on Jun. 26, 2019, which claims the benefit of priority to Chinese Patent Application No. 201810912738.3, filed on Aug. 10, 2018, and entitled "SERVICE CONFLICT PROCESSING METHOD, USER TERMINAL AND COMPUTER READABLE STORAGE MEDIUM". The entire disclosures of the above applications are incorporated herein by reference.

TECHNICAL FIELD

The present disclosure generally relates to communication technology field, and more particularly, to a service conflict processing method, a user terminal and a computer readable storage medium.

BACKGROUND

Enhanced Mobile Broadband (eMBB) and Ultra Reliability and Low Latency Communication (URLLC) are two 5G application scenarios defined by the 3rd Generation Partnership Project (3GPP).

URLLC services have strict requirements on latency and reliability. To meet the requirements, a larger bandwidth needs to be allocated to the URLLC services, so that the URLLC services can complete highly reliable transmission under strict latency requirements. However, due to burstiness and sparseness of the URLLC services, if all bandwidth is allocated to the URLLC services, it may cause a serious waste of spectrum resources when no URLLC service arrives, resulting in low spectrum resource utilization. Therefore, to improve the utilization of spectrum resources, the URLLC services and eMBB services can use spectrum resources in a multiplexing manner.

The eMBB services and the URLLC services have different requirements for latency and different service characteristics. Specifically, URLLC service data is generally relatively small. To meet strict latency requirements, the URLLC services use smaller time slots for scheduling, and generally use short Physical Uplink Control Channel (PUCCH) to transmit Uplink Control Information (UCI). eMBB service data is generally relatively large. To improve the utilization of spectrum resources, the eMBB services use larger time slots for scheduling, and UCI of the eMBB services are transmitted using a long PUCCH.

As scheduling granularity of the eMBBs service is different from that of the URLLC services, the URLLC services may arrive at a certain intermediate moment in UCI transmission of the eMBB services. To ensure the reliability of the URLLC services and meet low latency requirements, data and UCI of the URLLC services are transmitted first, and transmission of the UCI of the eMBB services may be discarded or stopped.

When the UCI of the eMBB services contains Hybrid Automatic Repeat ReQuest (HARQ)-Acknowledgment (ACK) information of multiple Transport Blocks (TBs), the corresponding TBs need to be retransmitted, which reduces spectrum efficiency of a system.

SUMMARY

Embodiments of the present disclosure may improve spectrum efficiency of a system when UCI including HARQ-ACK information of an eMBB service conflicts with an uplink URLLC service in transmission time under a multiplexing scenario of eMBB and URLLC.

In an embodiment of the present disclosure, a service conflict processing method is provided, including: determining whether UCI of an eMBB service being transmitted conflicts with data or UCI of an URLLC service in transmission time, wherein the UCI of the eMBB service includes HARQ-ACK information; and if the UCI of the eMBB service conflicts with the data or the UCI of the URLLC service in transmission time, delaying transmission of the UCI of the eMBB service.

Optionally, the UCI of the eMBB service conflicting with the data or the UCI of the URLLC service in transmission time includes any one of the following: HARQ-ACK information in the UCI of the eMBB service conflicting with the UCI of the URLLC service in transmission time; HARQ-ACK information in the UCI of the eMBB service conflicting with the data of the URLLC service in transmission time; HARQ-ACK information and uplink Scheduling Request (SR) information in the UCI of the eMBB service conflicting with the UCI of the URLLC service in transmission time; or HARQ-ACK information and uplink SR information in the UCI of the eMBB service conflicting with the data of the URLLC service in transmission time.

Optionally, before delaying transmission of the UCI of the eMBB service, the method further includes: determining whether a bit number of the HARQ-ACK information in the UCI of the eMBB service is greater than a first bit threshold corresponding to conflicting parties; and if the bit number of the HARQ-ACK information in the UCI of the eMBB service is greater than the first bit threshold, delaying the transmission of the UCI of the eMBB service.

Optionally, delaying transmission of the UCI of the eMBB service includes: delaying transmission of the UCI of the eMBB service based on scheduling of a base station.

Optionally, delaying transmission of the UCI of the eMBB service based on scheduling of the base station includes: combining the UCI of the eMBB service with UCI fed back by the base station when scheduling downlink eMBB data after a conflict occurs, and transmitting the combined UCI using a PUCCH resource indicated by the base station.

Optionally, delaying transmission of the UCI of the eMBB service based on scheduling of the base station includes: transmitting the UCI of the eMBB service using a PUCCH resource indicated by the base station through DCI for feeding back data in the DCI.

Optionally, a value of a preset bit in the DCI is used by the base station to indicate that the PUCCH resource for feeding back the data in the DCI is used to transmit the UCI of the eMBB service.

Optionally, if a format of the DCI is 1_0, the preset bit includes 7 bits behind a frequency domain resource domain in the DCI.

Optionally, delaying transmission of the UCI of the eMBB service based on scheduling of the base station includes: using a PUSCH resource for transmitting uplink eMBB data to transmit the UCI of the eMBB service in a multiplexing manner, wherein the PUSCH resource is scheduled by the base station or scheduling-free.

Optionally, when a time slot for transmitting the UCI of the eMBB service is also used to transmit other UCI, delaying transmission of the UCI of the eMBB service based on scheduling of the base station includes: combining the UCI of the eMBB service with the other UCI, and using a PUSCH resource used by the base station for scheduling the uplink eMBB data after a conflict occurs to transmit the combined UCI.

Optionally, delaying transmission of the UCI of the eMBB service based on scheduling of the base station includes: using a PUSCH resource indicated by the base station through DCI to transmit the UCI of the eMBB service.

Optionally, the method further includes: if a bit number of HARQ-ACK information in the UCI of the eMBB service is less than or equal to the first bit threshold, discarding or stopping transmitting the UCI of the eMBB service.

In an embodiment of the present disclosure, a user terminal is provided, including: a first determining circuitry configured to determine whether UCI of an eMBB service being transmitted conflicts with data or UCI of an URLLC service in transmission time, wherein the UCI of the eMBB service includes HARQ-ACK information; and a first processing circuitry configured to: if the UCI of the eMBB service conflicts with the data or the UCI of the URLLC service in transmission time, delay transmission of the UCI of the eMBB service.

Optionally, the UCI of the eMBB service conflicting with the data or the UCI of the URLLC service in transmission time includes any one of the following: HARQ-ACK information in the UCI of the eMBB service conflicting with the UCI of the URLLC service in transmission time; HARQ-ACK information in the UCI of the eMBB service conflicting with the data of the URLLC service in transmission time; HARQ-ACK information and uplink Scheduling Request (SR) information in the UCI of the eMBB service conflicting with the UCI of the URLLC service in transmission time; or HARQ-ACK information and uplink SR information in the UCI of the eMBB service conflicting with the data of the URLLC service in transmission time.

Optionally, the user terminal further includes: a second determining circuitry configured to determine whether a bit number of the HARQ-ACK information in the UCI of the eMBB service is greater than a first bit threshold corresponding to conflicting parties; wherein the first processing circuitry is configured to: if the bit number of the HARQ-ACK information in the UCI of the eMBB service is greater than the first bit threshold, delay the transmission of the UCI of the eMBB service.

Optionally, the first processing circuitry is configured to delay transmission of the UCI of the eMBB service based on scheduling of a base station.

Optionally, the first processing circuitry includes a first processing sub-circuitry configured to: combine the UCI of the eMBB service with UCI fed back by the base station when scheduling downlink eMBB data after a conflict occurs, and transmit the combined UCI using a PUCCH resource indicated by the base station.

Optionally, the first processing circuitry includes a second processing sub-circuitry configured to: transmit the UCI of the eMBB service using a PUCCH resource indicated by the base station through DCI for feeding back data in the DCI.

Optionally, the first processing circuitry includes a third processing sub-circuitry configured to: use a PUSCH resource for transmitting uplink eMBB data to transmit the UCI of the eMBB service in a multiplexing manner, wherein the PUSCH resource is scheduled by the base station or scheduling-free.

Optionally, the third processing sub-circuitry is configured to: when a time slot for transmitting the UCI of the eMBB service is also used to transmit other UCI, combine the UCI of the eMBB service with the other UCI, and use a PUSCH resource used by the base station for scheduling the uplink eMBB data after a conflict occurs to transmit the combined UCI.

Optionally, the first processing circuitry includes a fourth processing sub-circuitry configured to: use a PUSCH resource indicated by the base station through DCI to transmit the UCI of the eMBB service.

Optionally, the user terminal further includes a second processing circuitry configured to: if a bit number of HARQ-ACK information in the UCI of the eMBB service is less than or equal to the first bit threshold, discard or stop transmitting the UCI of the eMBB service.

In an embodiment of the present disclosure, a computer readable storage medium having computer instructions stored therein is provided, wherein when the computer instructions are executed, any one of the above methods is performed.

In an embodiment of the present disclosure, a user terminal including a memory and a processor is provided, wherein the memory has computer instructions stored therein, and when the processor executes the computer instructions, any one of the above methods is performed.

Embodiments of the present disclosure may provide following advantages.

In embodiments of the present disclosure, if the UCI of the eMBB service conflicts with the data or the UCI of the URLLC service in transmission time, transmission of the UCI of the eMBB service is delayed, instead of discarding or stopping transmission of the eMBB service. In this way, the base station can still obtain the HARQ-ACK information in the UCI of the eMBB service, and when the HARQ-ACK information is ACK information, corresponding TB does not need to be retransmitted, thus effectively improving spectrum efficiency of a system.

DETAILED DESCRIPTION

In existing techniques, when the UCI of the eMBB service being transmitted conflicts with the data or the UCI of the URLLC service in transmission time, the data and the UCI of the URLLC service are transmitted first, and transmission of the UCI of the eMBB service is discarded or stopped, so as to ensure the reliability of the URLLC service and meet low latency requirements. If the UCI of the eMBB service contains HARQ-ACK information of multiple TBs, a UE needs to retransmit all the corresponding TBs when the HARQ-ACK information is ACK information, which reduces spectrum efficiency of the system.

In embodiments of the present disclosure, a service conflict processing method is provided. If the UCI of the eMBB service conflicts with the data or the UCI of the URLLC service in transmission time, transmission of the UCI of the eMBB service is delayed, instead of discarding or stopping transmission of the eMBB service. In this way, a terminal does not need to retransmit corresponding TBs when HARQ-ACK information is ACK information, thus effectively improving spectrum efficiency of a system.

In order to clarify the objects, characteristics and advantages of the disclosure, embodiments of present disclosure will be described in detail in conjunction with accompanying drawings.

Figure 1:
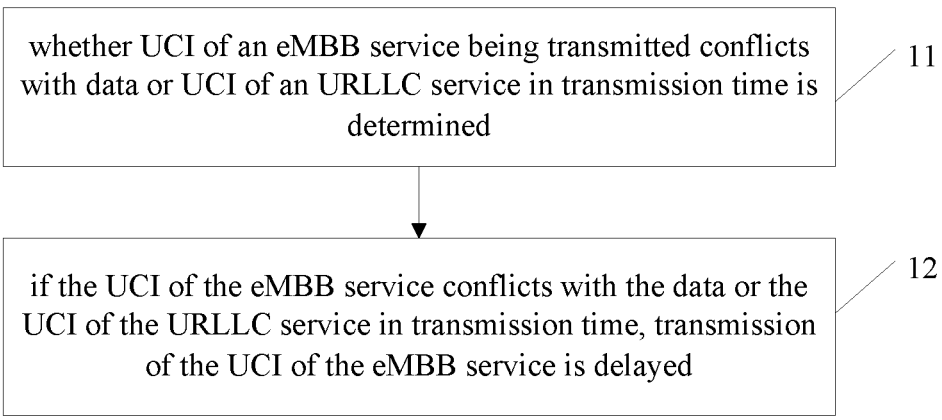
FIG. 1 is a flow chart of a service conflict processing method according to an embodiment.

FIG. 1 is a flow chart of a service conflict processing method according to an embodiment. Referring to FIG. 1, the method may include steps 11 and 12.

In step 11, whether UCI of an eMBB service being transmitted conflicts with data or UCI of an URLLC service in transmission time is determined.

In some embodiments, the UCI of the eMBB service includes HARQ-ACK information.

In practical communication, for two communication parties supporting a HARQ mechanism, when a receptor receives a data packet, if the received data packet is error-free, the receptor feeds back affirmative ACK information to a transmitter. If there is an error in the received data packet, the receptor feeds back negative acknowledgment (NACK) information to the transmitter. The ACK information and NACK information are collectively referred to as HARQ-ACK information. When receiving the ACK information, the transmitter will transmit a next data packet, but when receiving the NACK information, the transmitter will retransmit the same data packet.

In practice, UCI may include three types of control information: uplink Scheduling Request (SR), HARQ-ACK and Channel State Information (CSI).

In the embodiments of the present disclosure, the UCI of the eMBB service may include at least HARQ-ACK information. In this case the UCI of the eMBB service may include merely HARQ-ACK information, or include HARQ-ACK information and SR information, or include HARQ-ACK information, SR information, and CSI information.

For the case that the UCI of the eMBB service includes HARQ-ACK information, SR information and CSI information, as a priority of the CSI is low, when a service conflict occurs, the CSI can be directly discarded. In this case, the situation is equivalent to a situation where merely HARQ-ACK information or both HARQ-ACK and SR information are included in the UCI of the eMBB service. Those skilled in the art can refer to descriptions of the situation when merely HARQ-ACK information or both HARQ-ACK and SR information are included in the UCI of the eMBB service for specific implementation, which are not described in detail here.

In some embodiments, the URLLC service UCI may include merely SR information, or merely HARQ-ACK information, or both HARQ-ACK and SR information. A situation where CSI information is included in the URLLC service UCI is not considered.

In step 12, if the UCI of the eMBB service conflicts with the data or the UCI of the URLLC service in transmission time, transmission of the UCI of the eMBB service is delayed.

In some embodiments, if the UCI of the eMBB service conflicts with the data or the UCI of the URLLC service in transmission time, transmission of the UCI of the eMBB service is delayed, instead of discarding or stopping transmission of the eMBB service. In this way, a terminal does not need to retransmit corresponding TBs when HARQ-ACK information is ACK information, thus effectively improving spectrum efficiency of a system.

Figure 2:
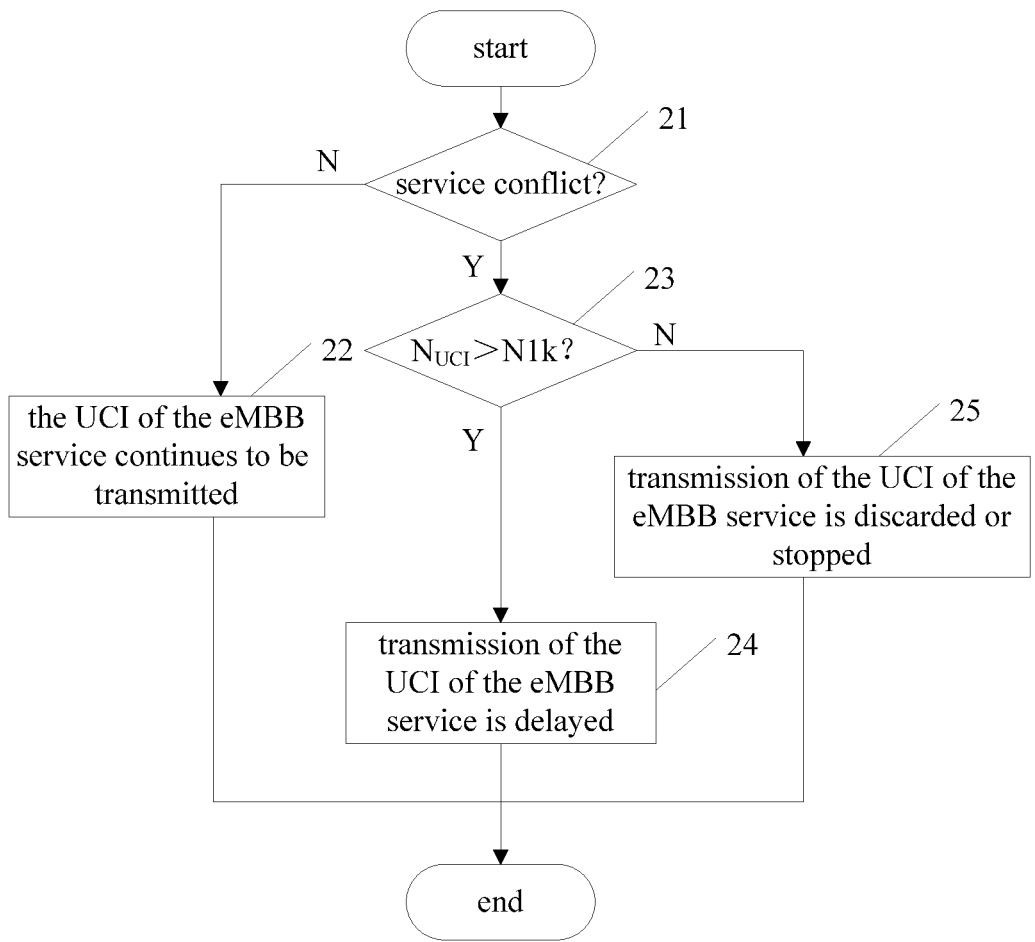
FIG. 2 is a flow chart of a service conflict processing method according to an embodiment.

FIG. 2 is a flow chart of a service conflict processing method according to an embodiment. The method includes steps 21 to 25.

In step 21, whether UCI of an eMBB service being transmitted conflicts with data or UCI of an URLLC service in transmission time is determined.

In some embodiments, the UCI of the eMBB service includes HARQ-ACK information.

Details of step 21 can be referred to the above descriptions of step 11, and are not described here.

When the UCI of the eMBB service being transmitted conflicts with the data or the UCI of the URLLC service in transmission time, step 23 is performed; otherwise, step 22 is performed.

In step 22, the UCI of the eMBB service continues to be transmitted.

In step 23, whether a bit number $N_{UCI}$ of HARQ-ACK information in the UCI of the eMBB service is greater than a first bit threshold Nlk corresponding to conflicting parties is determined, where k is a positive integer, and a value of k corresponds to the conflicting parties.

In some embodiments, before delaying the transmission of the UCI of the eMBB service, it may be determined whether the bit number $N_{UCI}$ of the HARQ-ACK information in the UCI of the eMBB service is greater than the first bit threshold Nlk corresponding to the conflicting parties.

In some embodiments, the first bit threshold Nlk may be predefined by the 5G New Radio access technology (NR) standard, or configured through high-level signaling. The conflicting parties are different, and the corresponding first bit threshold may be the same or different, where the conflicting parties being different may include one of the conflicting parties being different, or both conflicting parties are different.

In some embodiments, the UCI of the eMBB service conflicting with the data or the UCI of the URLLC service in transmission time includes any one of the following:

first, HARQ-ACK information in the UCI of the eMBB service conflicting with the UCI of the URLLC service in transmission time, i.e., the conflicting parties are HARQ-ACK information in the UCI of the eMBB service and the UCI of the URLLC service;

second, HARQ-ACK information in the UCI of the eMBB service conflicting with the data of the URLLC service in transmission time, i.e., the conflicting parties are HARQ-ACK information in the UCI of the eMBB service and the data of the URLLC service;

third, HARQ-ACK information and uplink SR information in the UCI of the eMBB service conflicting with the UCI of the URLLC service in transmission time, i.e., the conflicting parties are HARQ-ACK information and uplink SR information in the UCI of the eMBB service and the UCI of the URLLC service; or fourth, HARQ-ACK information and uplink SR information in the UCI of the eMBB service conflicting with the data of the URLLC service in transmission time, i.e., the conflicting parties are HARQ-ACK information and uplink SR information in the UCI of the eMBB service and the data of the URLLC service.

In the embodiments of the present disclosure, for ease of description, the first bit threshold corresponding to the conflicting parties in the first case above is denoted as N11, the first bit threshold corresponding to the conflicting parties in the second case is denoted as N12, the first bit threshold corresponding to the conflicting parties in the third case is denoted as N13, and the first bit threshold corresponding to the conflicting parties in the fourth case is denoted as N14.

When $N_{UCI}$>Nlk, step 24 is performed; otherwise, step 25 is performed.

In step 24, transmission of the UCI of the eMBB service is delayed.

$N_{UCI}$>Nlk indicates that the number of TBs corresponding to the HARQ-ACK information is relatively a large. Therefore, when $N_{UCI}$>Nlk, the transmission of the UCI of the eMBB service is delayed to further improve the spectrum efficiency of the system.

Taking the conflicting parties in the first case as an example, if $N_{UCI}$>Nlk, the transmission of the UCI of the eMBB service is delayed.

Alternatively, in some embodiments, if the first bit threshold is not configured or the first bit threshold is 0, as long as the UCI of the eMBB service conflicts with the data or the UCI of the URLLC service in transmission time, the transmission of the UCI of the eMBB service is delayed.

In step 25, transmission of the UCI of the eMBB service is discarded or stopped.

When the bit number $N_{UCI}$ of HARQ-ACK information in the UCI of the eMBB service is less than or equal to the first bit threshold Nlk corresponding to the conflicting parties, it indicates that the number of TBs corresponding to the HARQ-ACK information is small, and thus the transmission of the UCI of the eMBB service may be discarded or stopped.

Figure 3:
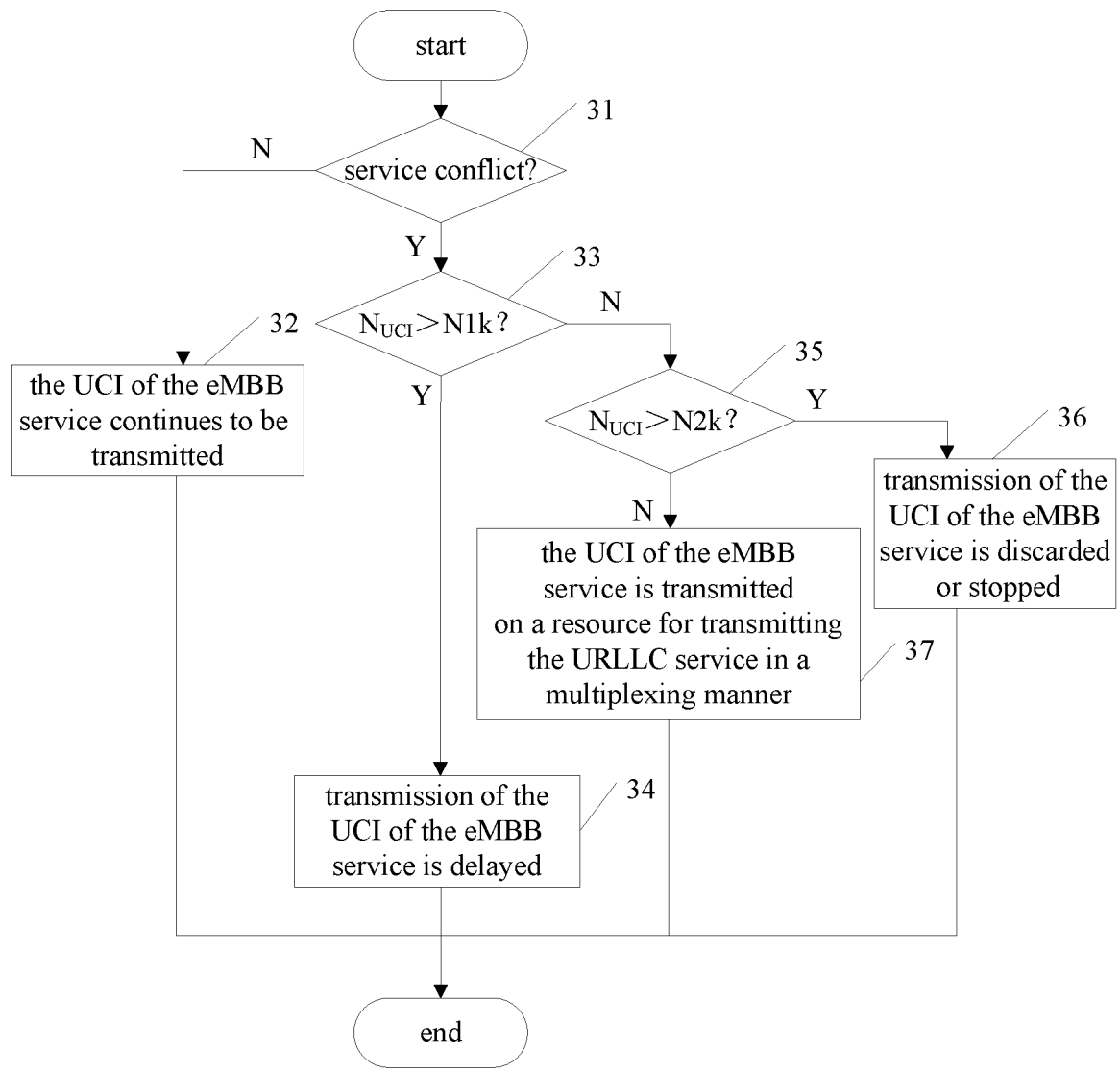
FIG. 3 is a flow chart of a service conflict processing method according to an embodiment.

FIG. 3 is a flow chart of a service conflict processing method according to an embodiment. The method includes steps 31 to 37.

In step 31, whether UCI of an eMBB service being transmitted conflicts with data or UCI of an URLLC service in transmission time is determined.

When the UCI of the eMBB service being transmitted conflicts with the data or the UCI of the URLLC service in transmission time, step 33 is performed; otherwise, step 32 is performed.

In step 32, the UCI of the eMBB service continues to be transmitted.

In step 33, whether a bit number $N_{UCI}$ of HARQ-ACK information in the UCI of the eMBB service is greater than a first bit threshold Nlk corresponding to conflicting parties is determined.

When the bit number $N_{UCI}$ of HARQ-ACK information in the UCI of the eMBB service is greater than the first bit threshold Nlk corresponding to the conflicting parties, step 34 is performed; otherwise, step 35 is performed.

In step 34, transmission of the UCI of the eMBB service is delayed.

Details of steps 31 to 34 can be referred to the above descriptions of steps 21 to 24, and are not described here.

In step 35, whether the bit number $N_{UCI}$ of HARQ-ACK information in the UCI of the eMBB service is greater than a second bit threshold N2k corresponding to the conflicting parties is determined.

k is a positive integer, and a value of k corresponds to the conflicting parties. The second bit threshold N2k is smaller than the first bit threshold Nlk corresponding to the same conflicting parties.

In some embodiments, the second bit threshold N2k may be predefined by the 5G NR standard, or configured through high-level signaling. The conflicting parties are different, and the corresponding second bit threshold N2k may be the same or different.

In the embodiments of the present disclosure, for ease of description, the second bit threshold corresponding to the first bit threshold N11 is denoted as N21, the second bit threshold corresponding to the first bit threshold N12 is denoted as N22, the second bit threshold corresponding to the first bit threshold N13 is denoted as N23, and the second bit threshold corresponding to the first bit threshold N14 is denoted as N24.

When $N_{UCI}$>N2k, step 36 is performed; otherwise, step 37 is performed.

In step 36, transmission of the UCI of the eMBB service is discarded or stopped.

When the bit number $N_{UCI}$ of HARQ-ACK information in the UCI of the eMBB service is greater than the second bit threshold N2k corresponding to the conflicting parties, it indicates that the number of TBs corresponding to the HARQ-ACK information is large, and thus the transmission of the UCI of the eMBB service may be discarded or stopped.

In step 37, the UCI of the eMBB service is transmitted on a resource for transmitting the URLLC service in a multiplexing manner.

In some embodiments, when the UCI of the eMBB service is transmitted on the resource for transmitting the URLLC service, the UCI of the eMBB service and the URLLC service may be uniformly coded, that is, the UCI of the eMBB service is transmitted on the resource for transmitting the URLLC service in a multiplexing manner.

In some embodiments, when the HARQ-ACK information in the UCI of the eMBB service conflicts with the UCI of the URLLC service in transmission time, if $N_{UCI}$≤N2k, the UCI of the eMBB service may be transmitted on the resource for transmitting the URLLC service in a multiplexing manner.

In some embodiments, when the HARQ-ACK information in the UCI of the eMBB service conflicts with the data of the URLLC service in transmission time, if $N_{UCI}$≤N2k, the UCI of the eMBB service may be transmitted on the resource for transmitting the URLLC service in a multiplexing manner.

In some embodiments, when the HARQ-ACK information and SR information in the UCI of the eMBB service conflict with the UCI of the URLLC service in transmission time, the UCI of the eMBB service may be transmitted on the resource for transmitting the URLLC service in a multiplexing manner.

In this case, if the UCI of the URLLC service contains SR information, as a priority of the URLLC service is higher, the SR information in the UCI of the eMBB service may be discarded, and merely the HARQ-ACK information in the UCI of the eMBB service is transmitted on the resource for transmitting the URLLC service.

If the UCI of the URLLC service does not contain SR information, the SR information in the UCI of the eMBB service may be discarded or retained.

In some embodiments, when the HARQ-ACK information and SR information in the UCI of the eMBB service conflict with the data of the URLLC service in transmission time, the UCI of the eMBB service may be transmitted on the resource for transmitting the URLLC service in a multiplexing manner.

To enable those skilled in the art to implement the embodiments of the present disclosure more clearly, how to delay the transmission of the UCI of the eMBB service when the UCI of the eMBB service conflicts with the data or the UCI of the URLLC service in transmission time is described in detail below.

In some embodiments, the terminal may delay transmitting the UCI of the eMBB service based on scheduling of the base station.

In practice, the base station may use various methods for scheduling, which is not specifically limited.

In some embodiments, the terminal may combine the UCI of the eMBB service with UCI fed back by the base station when scheduling downlink eMBB data after a conflict occurs, and use a PUCCH resource indicated by the base station to transmit the combined UCI.

Specifically, after the conflict occurs, the terminal may feed back the UCI for scheduling the downlink eMBB data to the base station if there is downlink eMBB data scheduling. At this time, the terminal may combine the delayed transmitted eMBB UCI with the UCI for scheduling downlink eMBB data fed back by the base station.

Further, the base station may indicate a PUCCH resource in the DCI for scheduling the downlink eMBB data to use to transmit the combined UCI. The PUCCH resource for transmitting the combined UCI may be determined according to length of the combined UCI.

For example, the HARQ-ACK information of the URLLC service is transmitted in an OFDM symbol 7 of a slot n, and the HARQ-ACK information of the eMBB service is transmitted in OFDM symbols 7-13 of the slot n. Assume that the HARQ-ACK information feedback bit of the eMBB service is 1111001111 which includes 10 bits.

As the priority of the HARQ-ACK information of the URLLC service is higher than the priority of the HARQ-ACK information of the eMBB service, the terminal may first transmit the HARQ-ACK information of the URLLC service in slot n after a conflict occurs, and delay transmitting the HARQ-ACK information of the eMBB service.

After the base station receives the HARQ-ACK information of the URLLC service from the terminal, the base station knows that the terminal has not transmitted the HARQ-ACK information of the eMBB service. Therefore, when there is downlink eMBB data scheduling, the base station may schedule an eMBB data of slot (n+1) in a slot (n+1), and instruct the terminal to feed back HARQ-ACK information of the eMBB data in a slot (n+3).

Assuming that the HARQ-ACK information of the eMBB data is 1 bit, a bit number of the combined UCI is 11. The UE may select the PUCCH resource according to the total number of UCI bits after the combination and feed back in the slot (n+3).

In the combined UCI, the delayed transmitted UCI of the eMBB service may be placed after the HARQ-ACK information of the feedback eMBB data, such as 11110011110 (the last 0 indicates that the eMBB data scheduled by the base station after the conflict has been incorrectly decoded), or in front of the HARQ-ACK information of the feedback eMBB data, such as 01111001111 (the first 0 indicates that the eMBB data scheduled by the base station after the conflict has been incorrectly decoded).

In some embodiments, the terminal may use a PUCCH resource indicated by the base station through the DCI for feeding back data in the DCI to transmit the UCI of the eMBB service.

Specifically, after a conflict occurs, the base station may indicate the PUCCH resource to the terminal through DCI, so as to transmit the UCI of the delayed eMBB service. The PDSCH resource indicated in the DCI is empty, and after receiving the DCI, the terminal does not need to feedback HARQ-ACK information to the data in the DCI, and directly uses the PUCCH resource indicated in the DCI to transmit the UCI of the eMBB service.

In some embodiments, the base station may indicate to the terminal a PUCCH resource used for feeding back the data in the DCI to transmit the UCI of the eMBB service through a value of a preset bit in the DCI. Selection of the preset bit may be determined based on the DCI.

For example, in practical communication, when a format of the DCI is 1_0, if a frequency domain resource field of the DCI is set to 1, it indicates that the DCI can be used for an initial access process, but whether the DCI activates a contention-based random access process needs to be determined according to a value of the last 6 bits of the frequency domain resource domain of the DCI.

In some embodiments, the base station may indicate to the terminal that the DCI has activated a contention-based random access process, when the last 7 bits of the frequency domain resource field of the DCI are 0000000, and indicate to the terminal to transmit the UCI of the eMBB service on the PUCCH resource used for feeding back the data in the DCI, when the last 7 bits of the frequency domain resource field of the DCI are 0000001.

For another example, when the DCI format is 1_1, the base station may set the frequency domain resource field of the DCI to 0 when a resource allocation type is 0, or set the frequency domain resource field of the DCI to 1 when the resource allocation type is 1, thereby instructing the terminal to use the PUCCH resource for feeding back the data in the DCI to transmit the UCI of the eMBB service.

In some embodiments, the terminal may adopt a multiplexing mode to use a PUSCH resource for transmitting uplink eMBB data to transmit the UCI of the eMBB service.

In some embodiments, the PUSCH resource may be scheduling-free, that is, no scheduling by the base station is required. In some embodiments, the PUSCH resource may be scheduled by the base station.

If the PUSCH resource is scheduled by the base station, specifically, after a conflict occurs, if the terminal has uplink eMBB data to be transmitted to the base station, the base station may transmit scheduling information about the uplink eMBB data to the terminal. The scheduling information indicates to the terminal the PUSCH resource for delayed transmission of the UCI of the eMBB service.

After receiving the scheduling information, the terminal may determine which PUSCH resource of the indicated PUSCH resource is used for delayed transmission of the UCI of the eMBB service according to a beta_offset parameter in the DCI for scheduling the PUSCH resource. Alternatively, the terminal may use a beta_offset parameter configured by high-level signaling to determine which PUSCH resource of the indicated PUSCH resource is used for delayed transmission of the UCI of the eMBB service.

After determining the PUSCH resource specifically used for delayed transmission of the UCI of the eMBB service, the terminal may adopt a multiplexing mode to transmit the UCI of the eMBB service using the determined PUSCH resource.

In some embodiments, if a time slot for transmitting the UCI of the eMBB service is also used to transmit other UCI at the same time, the UCI of the eMBB service may be combined with the other UCI, and a PUSCH resource used by the base station for scheduling the uplink eMBB data after a conflict occurs may be used to transmit the combined UCI. The other UCI may be the UCI fed back by the base station when scheduling downlink data before the conflict occurs, or the UCI fed back by the base station when scheduling downlink data when the conflict occurs, or the UCI fed back by the base station when scheduling downlink data after the conflict occurs.

Detailed example are given below for further description.

For example, the HARQ-ACK information of the URLLC service is transmitted in an OFDM symbol 7 of a slot n, and the HARQ-ACK information of the eMBB service is transmitted in OFDM symbols 7-13 of the slot n. Assume that the HARQ-ACK information feedback bit of the eMBB service is 1111001111 including 10 bits.

As the priority of the HARQ-ACK information of the URLLC service is higher than the priority of the HARQ-ACK information of the eMBB service, the terminal may first transmit the HARQ-ACK information of the URLLC service in the slot n after a conflict occurs, and delay transmitting the HARQ-ACK information of the eMBB service.

After the base station receives the HARQ-ACK information of the URLLC service from the terminal, the base station knows that the terminal has not transmitted the HARQ-ACK information of the eMBB service.

In some embodiments, if the terminal has grant free eMBB data to be transmitted in slot (n+1), the terminal first determines which PUSCH resource in a scheduling-free PUSCH resource is available for transmitting the UCI of the eMBB service through a beta_offset parameter configured by higher layer signaling, and uses the determined PUSCH resource to transmit the delayed UCI of the eMBB service in a multiplexing manner.

In some embodiments, the base station may schedule the PUSCH resource through DCI in the slot (n+1), and instruct the terminal to transmit the delayed UCI of the eMBB service in a slot (n+3). After receiving the scheduling information, the terminal may determine which PUSCH resource of the scheduled PUSCH resource is used to transmit the UCI of the eMBB service according to a beta_offset parameter indicated in the DCI, and use the determined PUSCH resource to transmit the delayed UCI of the eMBB service in a multiplexing manner.

In some embodiments, the base station may schedule the PUSCH resource through DCI in the slot (n+1), and instruct the terminal to transmit the delayed UCI of the eMBB service in the slot (n+3). If the terminal has additional HARQ-ACK information for scheduling downlink eMBB data in the slot (n+3), the terminal may first combine the HARQ-ACK information for scheduling downlink eMBB data with the UCI of the delayed UCI of the eMBB service, and then use the determined PUSCH resource to transmit the UCI of the eMBB service.

In some embodiments, the terminal may use a PUSCH resource indicated by the base station through DCI to transmit the UCI of the eMBB service.

Specifically, after a conflict occurs, the base station detects whether an uplink buffer of the terminal is empty. If the uplink buffer of the terminal is empty, it indicates that the terminal has no uplink eMBB data to be transmitted at this time, and thus the base station may indicate the PUSCH resource to the terminal through the DCI for transmitting the delayed UCI of the eMBB service. After receiving the DCI, the terminal does not need to feed back HARQ-ACK information on the data in the DCI, and directly uses the PUSCH resource indicated in the DCI to transmit the UCI of the eMBB service.

For example, when the uplink buffer of the terminal is empty, the base station may separately schedule an uplink PUSCH resource for the HARQ-ACK information of the delayed eMBB service. After the UE receives the DCI, as its uplink buffer is empty, the UE may transmit the HARQ-ACK information of the delayed eMBB service using the resource indicated by the DCI.

It should be noted that there are other possible methods that can be used for delayed transmission of the UCI of the eMBB service, which is not limited to the above-mentioned embodiments. However, no matter what method is used for delayed transmission of the UCI of the eMBB service, it does not limit the present disclosure, and all falls within the scope of the present disclosure.

From above, by any of the service conflict processing methods provided in the above embodiments, if the UCI of the eMBB service conflicts with the data or the UCI of the URLLC service in transmission time, transmission of the UCI of the eMBB service is delayed, which may effectively improve spectrum efficiency of a system.

To enable those skilled in the art to better understand and implement the present disclosure, embodiments of the present disclosure further provide an apparatus and a computer readable storage medium corresponding to the above methods.

Figure 4:
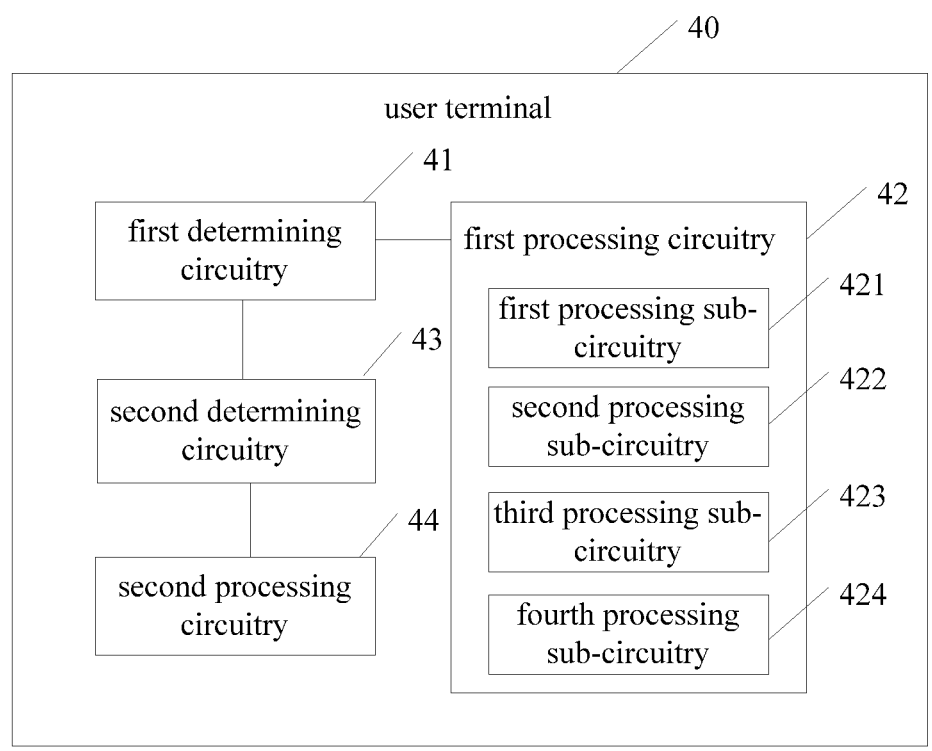
FIG. 4 is a structural diagram of a user terminal according to an embodiment.

FIG. 4 is a structural diagram of a user terminal 40 according to an embodiment. Referring to FIG. 4, the user terminal 40 may include a first determining circuitry 41 and a first processing circuitry 42.

The first determining circuitry 41 is configured to determine whether UCI of an eMBB service being transmitted conflicts with data or UCI of an URLLC service in transmission time, wherein the UCI of the eMBB service includes HARQ-ACK information.

The first processing circuitry 42 is configured to: if the UCI of the eMBB service conflicts with the data or the UCI of the URLLC service in transmission time, delay transmission of the UCI of the eMBB service.

In some embodiments, the UCI of the eMBB service conflicting with the data or the UCI of the URLLC service in transmission time includes any one of the following: HARQ-ACK information in the UCI of the eMBB service conflicting with the UCI of the URLLC service in transmission time; HARQ-ACK information in the UCI of the eMBB service conflicting with the data of the URLLC service in transmission time; HARQ-ACK information and uplink Scheduling Request (SR) information in the UCI of the eMBB service conflicting with the UCI of the URLLC service in transmission time; or HARQ-ACK information and uplink SR information in the UCI of the eMBB service conflicting with the data of the URLLC service in transmission time.

In some embodiments, the user terminal 40 further includes: a second determining circuitry 43 configured to determine whether a bit number of the HARQ-ACK information in the UCI of the eMBB service is greater than a first bit threshold corresponding to conflicting parties.

Accordingly, the first processing circuitry 42 is configured to: if the bit number of the HARQ-ACK information in the UCI of the eMBB service is greater than the first bit threshold, delay the transmission of the UCI of the eMBB service.

In some embodiments, the first processing circuitry 42 is configured to delay transmission of the UCI of the eMBB service based on scheduling of a base station.

In some embodiments, the first processing circuitry 42 includes a first processing sub-circuitry 421 configured to: combine the UCI of the eMBB service with UCI fed back by the base station when scheduling downlink eMBB data after a conflict occurs, and transmit the combined UCI using a PUCCH resource indicated by the base station.

In some embodiments, the first processing circuitry 42 includes a second processing sub-circuitry 422 configured to: transmit the UCI of the eMBB service using a PUCCH resource indicated by the base station through DCI for feeding back data in the DCI.

In some embodiments, the first processing circuitry 42 includes a third processing sub-circuitry 423 configured to: use a PUSCH resource for transmitting uplink eMBB data to transmit the UCI of the eMBB service in a multiplexing manner, wherein the PUSCH resource is scheduled by the base station or scheduling-free.

In some embodiments, the third processing sub-circuitry 423 is configured to: when a time slot for transmitting the UCI of the eMBB service is also used to transmit other UCI, combine the UCI of the eMBB service with the other UCI, and use a PUSCH resource used by the base station for scheduling the uplink eMBB data after a conflict occurs to transmit the combined UCI.

In some embodiments, the first processing circuitry 42 includes a fourth processing sub-circuitry 424 configured to: use a PUSCH resource indicated by the base station through DCI to transmit the UCI of the eMBB service.

It should be noted that in some embodiments, the first processing circuitry 42 may merely include one of the first processing sub-circuitry 421, the second processing sub-circuitry 422, the third processing sub-circuitry 423 and the fourth processing sub-circuitry 424, or include any two or more of them, which is not specifically limited, and those skilled in the art may make selections according to practical requirements.

In some embodiments, referring to FIG. 4, the user terminal 40 further includes a second processing circuitry 44 configured to: if a bit number of HARQ-ACK information in the UCI of the eMBB service is less than or equal to the first bit threshold, discard or stop transmitting the UCI of the eMBB service.

In an embodiment of the present disclosure, a computer readable storage medium having computer instructions stored therein is provided, wherein when the computer instructions are executed, any one of the above methods is performed.

In some embodiments, the computer readable storage medium may include a Read Only Memory (ROM), a Random Access Memory (RAM), a magnetic disk or an optical disk.

In an embodiment of the present disclosure, a user terminal including a memory and a processor is provided, wherein the memory has computer instructions stored therein, and when the processor executes the computer instructions, any one of the above methods is performed.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A service conflict processing method, comprising:
   determining whether UCI of an eMBB service being transmitted conflicts with data or UCI of an URLLC service in transmission time, wherein the UCI of the eMBB service comprises HARQ-ACK information; and
   in response to the UCI of the eMBB service conflicting with the data or the UCI of the URLLC service in transmission time, delaying transmission of the UCI of the eMBB service;
   wherein said the UCI of the eMBB service conflicting with the data or the UCI of the URLLC service in transmission time comprises any one of the following:
   HARQ-ACK information in the UCI of the eMBB service conflicting with the UCI of the URLLC service in transmission time;
   HARQ-ACK information in the UCI of the eMBB service conflicting with the data of the URLLC service in transmission time;
   HARQ-ACK information and uplink Scheduling Request (SR) information in the UCI of the eMBB service conflicting with the UCI of the URLLC service in transmission time; or
   HARQ-ACK information and uplink SR information in the UCI of the eMBB service conflicting with the data of the URLLC service in transmission time;
   wherein before delaying transmission of the UCI of the eMBB service, the method further comprises:
   determining whether a bit number of the HARQ-ACK information in the UCI of the eMBB service is greater than a first bit threshold corresponding to conflicting parties; and
   in response to the bit number of the HARQ-ACK information in the UCI of the eMBB service being greater than the first bit threshold, delaying the transmission of the UCI of the eMBB service.

2. The method according to claim 1, further comprising:
   in response to a bit number of HARQ-ACK information in the UCI of the eMBB service being less than or equal to the first bit threshold, discarding or stopping transmitting the UCI of the eMBB service.

3. The method according to claim 1, wherein delaying transmission of the UCI of the eMBB service comprises:
   delaying transmission of the UCI of the eMBB service based on scheduling of a base station.

4. The method according to claim 3, wherein delaying transmission of the UCI of the eMBB service based on scheduling of the base station comprises:
   combining the UCI of the eMBB service with UCI fed back to the base station when scheduling downlink eMBB data after a conflict occurs, and transmitting the combined UCI using a PUCCH resource indicated by the base station.

5. The method according to claim 3, wherein delaying transmission of the UCI of the eMBB service based on scheduling of the base station comprises:
   transmitting the UCI of the eMBB service using a PUCCH resource indicated by the base station through DCI for feeding back data in the DCI.

6. The method according to claim 3, wherein delaying transmission of the UCI of the eMBB service based on scheduling of the base station comprises:
   using a PUSCH resource for transmitting uplink eMBB data to transmit the UCI of the eMBB service in a multiplexing manner, wherein the PUSCH resource is scheduled by the base station or scheduling-free.

7. The method according to claim 6, wherein in response to a time slot for transmitting the UCI of the eMBB service being also used to transmit other UCI, delaying transmission of the UCI of the eMBB service based on scheduling of the base station comprises:
   combining the UCI of the eMBB service with the other UCI, and using a PUSCH resource used by the base station for scheduling the uplink eMBB data after a conflict occurs to transmit the combined UCI.

8. The method according to claim 3, wherein delaying transmission of the UCI of the eMBB service based on scheduling of the base station comprises:
   using a PUSCH resource indicated by the base station through DCI to transmit the UCI of the eMBB service.

9. A user terminal, comprising:
a first determining circuitry configured to determine whether UCI of an eMBB service being transmitted conflicts with data or UCI of an URLLC service in transmission time, wherein the UCI of the eMBB service comprises HARQ-ACK information; and
a first processing circuitry configured to: in response to the UCI of the eMBB service conflicting with the data or the UCI of the URLLC service in transmission time, delay transmission of the UCI of the eMBB service;
wherein the UCI of the eMBB service conflicting with the data or the UCI of the URLLC service in transmission time comprises any one of the following:
    HARQ-ACK information in the UCI of the eMBB service conflicting with the UCI of the URLLC service in transmission time;
    HARQ-ACK information in the UCI of the eMBB service conflicting with the data of the URLLC service in transmission time;
    HARQ-ACK information and uplink Scheduling Request (SR) information in the UCI of the eMBB service conflicting with the UCI of the URLLC service in transmission time; or
    HARQ-ACK information and uplink SR information in the UCI of the eMBB service conflicting with the data of the URLLC service in transmission time;
wherein the user terminal further comprises a second determining circuitry configured to determine whether a bit number of the HARQ-ACK information in the UCI of the eMBB service is greater than a first bit threshold corresponding to conflicting parties;
wherein the first processing circuitry is configured to: in response to the bit number of the HARQ-ACK information in the UCI of the eMBB service being greater than the first bit threshold, delay the transmission of the UCI of the eMBB service.

10. The user terminal according to claim 9, wherein the first processing circuitry is configured to delay transmission of the UCI of the eMBB service based on scheduling of a base station.

11. The user terminal according to claim 10, wherein the first processing circuitry comprises:
a first processing sub-circuitry configured to: combine the UCI of the eMBB service with UCI fed back to the base station when scheduling downlink eMBB data after a conflict occurs, and transmit the combined UCI using a PUCCH resource indicated by the base station.

12. The user terminal according to claim 10, wherein the first processing circuitry comprises:
a second processing sub-circuitry configured to: transmit the UCI of the eMBB service using a PUCCH resource indicated by the base station through DCI for feeding back data in the DCI.

13. The user terminal according to claim 10, wherein the first processing circuitry comprises:
a third processing sub-circuitry configured to: use a PUSCH resource for transmitting uplink eMBB data to transmit the UCI of the eMBB service in a multiplexing manner, wherein the PUSCH resource is scheduled by the base station or scheduling-free.

14. The user terminal according to claim 13, wherein the third processing sub-circuitry is configured to:
in response to a time slot for transmitting the UCI of the eMBB service being also used to transmit other UCI, combine the UCI of the eMBB service with the other UCI, and use a PUSCH resource used by the base station for scheduling the uplink eMBB data after a conflict occurs to transmit the combined UCI.

15. A non-transitory computer readable storage medium having computer instructions stored therein, wherein when the computer instructions are executed, the method of claim 1 is performed.

16. A user terminal comprising a memory and a processor, wherein the memory stores one or more programs, the one or more programs comprising computer instructions, which, when executed by the processor, cause the processor to:
determine whether UCI of an eMBB service being transmitted conflicts with data or UCI of an URLLC service in transmission time, wherein the UCI of the eMBB service comprises HARQ-ACK information; and
in response to the UCI of the eMBB service conflicting with the data or the UCI of the URLLC service in transmission time, delay transmission of the UCI of the eMBB service;
wherein the UCI of the eMBB service conflicting with the data or the UCI of the URLLC service in transmission time comprises any one of the following:
    HARQ-ACK information in the UCI of the eMBB service conflicting with the UCI of the URLLC service in transmission time;
    HARQ-ACK information in the UCI of the eMBB service conflicting with the data of the URLLC service in transmission time;
    HARQ-ACK information and uplink Scheduling Request (SR) information in the UCI of the eMBB service conflicting with the UCI of the URLLC service in transmission time; or
    HARQ-ACK information and uplink SR information in the UCI of the eMBB service conflicting with the data of the URLLC service in transmission time;
wherein before delaying transmission of the UCI of the eMBB service, the processor is further caused to:
    determine whether a bit number of the HARQ-ACK information in the UCI of the eMBB service is greater than a first bit threshold corresponding to conflicting parties; and
    in response to the bit number of the HARQ-ACK information in the UCI of the eMBB service being greater than the first bit threshold, delay the transmission of the UCI of the eMBB service.

* * * * *